United States Patent [19]

Kubo

[11] Patent Number: 5,115,569
[45] Date of Patent: May 26, 1992

[54] COORDINATE READING AND MARKING DEVICE

[76] Inventor: Akio Kubo, 655 Yamanouchi, Kamakura-shi Kanagawa-ken, Japan

[21] Appl. No.: 741,970

[22] Filed: Aug. 6, 1991

Related U.S. Application Data

[63] Continuation of Ser. No. 512,869, Apr. 23, 1990, abandoned.

[30] Foreign Application Priority Data

May 29, 1989 [JP] Japan ................. 1-137031

[51] Int. Cl.⁵ ................. G01B 5/26; G01B 7/03
[52] U.S. Cl. ................. 33/1 M; 33/1 CC; 33/773; 33/124; 33/123; 33/18.1
[58] Field of Search ............ 33/1 M, 1 CC, 772, 773, 33/449, 574, 579, 18.1, 20.1, 20.2, 121-124

[56] References Cited

U.S. PATENT DOCUMENTS

| | | | |
|---|---|---|---|
| 3,696,397 | 10/1972 | Raser | |
| 4,184,261 | 1/1980 | Buerner | 33/1 M |
| 4,370,811 | 2/1983 | Triggs et al. | 33/1 M |
| 4,419,672 | 12/1983 | Hind | 33/1 M |
| 4,519,138 | 5/1985 | Held | 33/18.1 |
| 4,616,419 | 10/1986 | Kubo | 33/122 |
| 4,617,740 | 10/1986 | Mikio | 33/122 |
| 4,625,410 | 12/1986 | Eder | 33/1 M |
| 4,718,000 | 1/1988 | Held | 33/18.1 |
| 4,738,029 | 4/1988 | Held | 33/18.1 |

FOREIGN PATENT DOCUMENTS

| | | | |
|---|---|---|---|
| 337962 | 6/1921 | Fed. Rep. of Germany | 33/450 |
| 8707013 | 11/1987 | World Int. Prop. O. | 33/1 M |

Primary Examiner—William A. Cuchlinski, Jr.
Assistant Examiner—Alvin Wirthlin
Attorney, Agent, or Firm—David O'Reilly

[57] ABSTRACT

This invention relates to a measuring device for a coordinate of a figure in which values of coordinate positions of a plurality of any given points are input, the coordinate of an asked for position relating to the given points is calculated and marking the asked for position. The measuring device for a coordinate of a figure comprises a body having rollers to trace a running line, a measuring lever pivoted on the body rotating right or left relative to the running line in a horizontal plane, characterized by a display, input device and a calculating device provided in the body, a tracing part, a reading/marking (writing) toggle switch, a reading switch and a marking needle provided in the measuring lever.

6 Claims, 2 Drawing Sheets

COORDINATE READING AND MARKING DEVICE

This is a continuation of co-pending application Ser. No. 07/512,869 filed on Apr. 23, 1990 now abandoned.

FIELD OF THE INVENTION

This invention relates to a device for measuring the coordinate of a figure in which values of coordinate positions for a plurality of any given points are input and the coordinate of a position asked for relating to the given points is calculated and the asked for position, such as center of circle, by reading three points or a new point by coordinate transformation is marked.

BACKGROUND OF THE INVENTION

Heretofore, the inventor herein proposed U.S. Pat. No. 4,616,419 to determine a point relating to a plurality of given points. However, the device of the U.S. Pat. No. 4,616,419 incorporated herein by reference requires complicated operation for a geometrical drawing, and a long time for a drawing.

BRIEF DESCRIPTION OF THE INVENTION

This invention intends to eliminate said drawbacks and provide a device with which it is possible to rapidly mark an asked for point in a coordinate plane without the necessity of a complicated calculation, or geometrical drawing.

Another object of this invention is to provide a measuring device for a coordinate of a figure. According to the invention, body 1 has rollers 2, 2 running along a line, a measuring lever 6 pivoted by a shaft on the body 1 rotating right or left relative to the running line in a horizontal plane, and characterized by a display 4, input means 3 and a calculating means provided in body 1. Tracing part 7, reading/marking (writing) turn over switch 9, reading switch 10 and a marking needle 8 are provided in measuring lever 6. The operation of the device is to read the position of given points by a signal $c_1$ of an angular counter $2a$ of encoder $2b$ from rollers 2 and a signal $c_2$ of angular counter $6a$ of encoder $6c$ of the measuring lever 6 and perform a calculation in CPU designated by a functional key. The difference between the position of the marking needle and asked for position is displayed.

The above and other objects, advantages and novel features of this invention will be more fully understood from the following detailed description and the accompanying drawings, in which like reference numbers indicated like or similar parts throughout wherein;

DETAILED DESCRIPTION OF THE INVENTION

Figure 1:
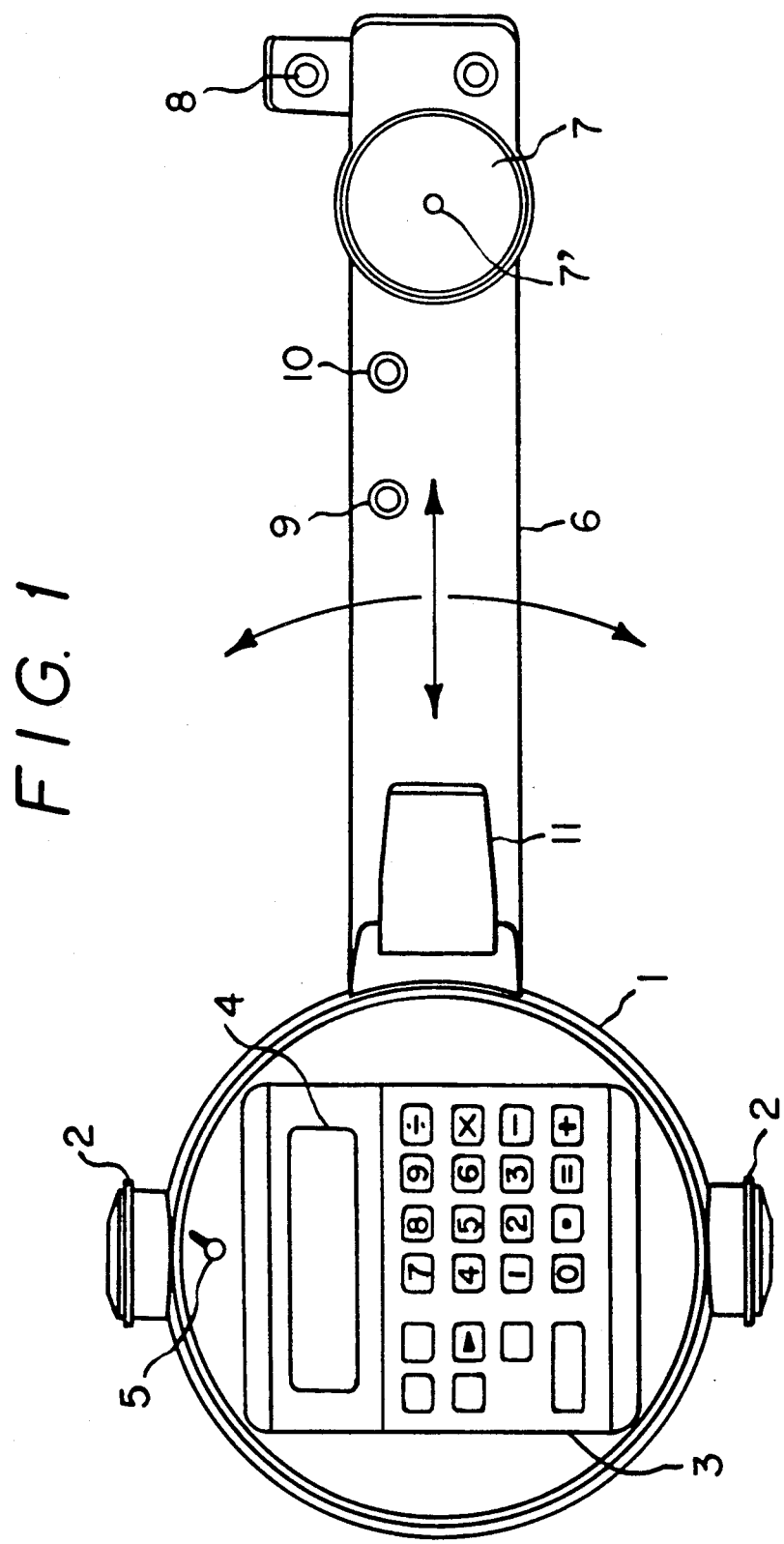
FIG. 1 is a plan view of one embodiment of a measuring device for a coordinate of a figure of the invention comprised of a body 1 and a measuring lever 6.
Figure 2:
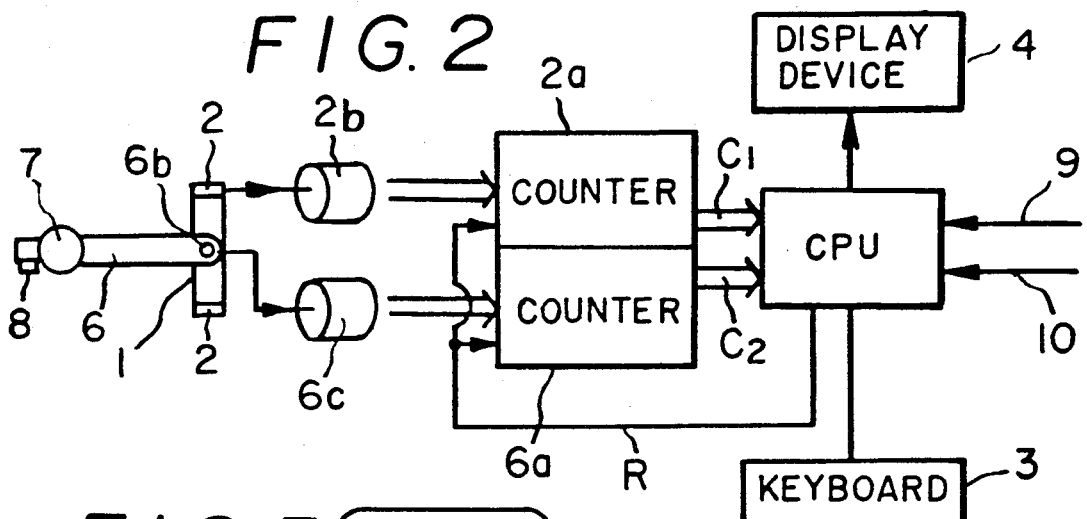
FIG. 2 is a block diagram of the measuring device.

Body 1 is comprised of calculating means, as shown in FIGS. 1 and 2, and has a pair of rollers 2, 2 for reciprocal movement along a line. At the upper face of body 1, there is an input device (key board) 3 and a displaying device 4 for displaying the result of a calculation in a calculating means and a fixing lever 5 for fixing rollers 2 at a desired position.

Measuring lever 6 is pivotally mounted on body 1 about a vertical shaft $6b$ that can swing right or left in a plane from the line of movement.

At the end of the measuring lever 6, there is a tracing part 7 comprised of convex lens and a reading mark 7' and a marking needle 8 for marking a designated position. At the middle of measuring lever 6, there is a reading/marking (writing) turnover or toggle switch 9 for activating reading switch 10. Toggle switch 9 permits direct reading of a position or displaying a calculated result (displaying the difference of a coordinate position between a position marked by needle 8 and the reading position or reading at a different point selected by sight mark 7') from calculating means in body 1. Reading switch 10 is activated by toggle switch 9 for directly reading the position of sight mark 7' on tracing part 7. That is, toggle switch 9 toggles between reading by reading switch 10 and marking.

Locking means 11 provided in body 1 rotates up and down for locking measuring lever 6 at a central position (i.e. the moving direction of body 1) and a power switch is OFF at a locking position and ON at a releasing position.

The following will explain the operation of the above device.

1) Reading operation.

Figure 3:
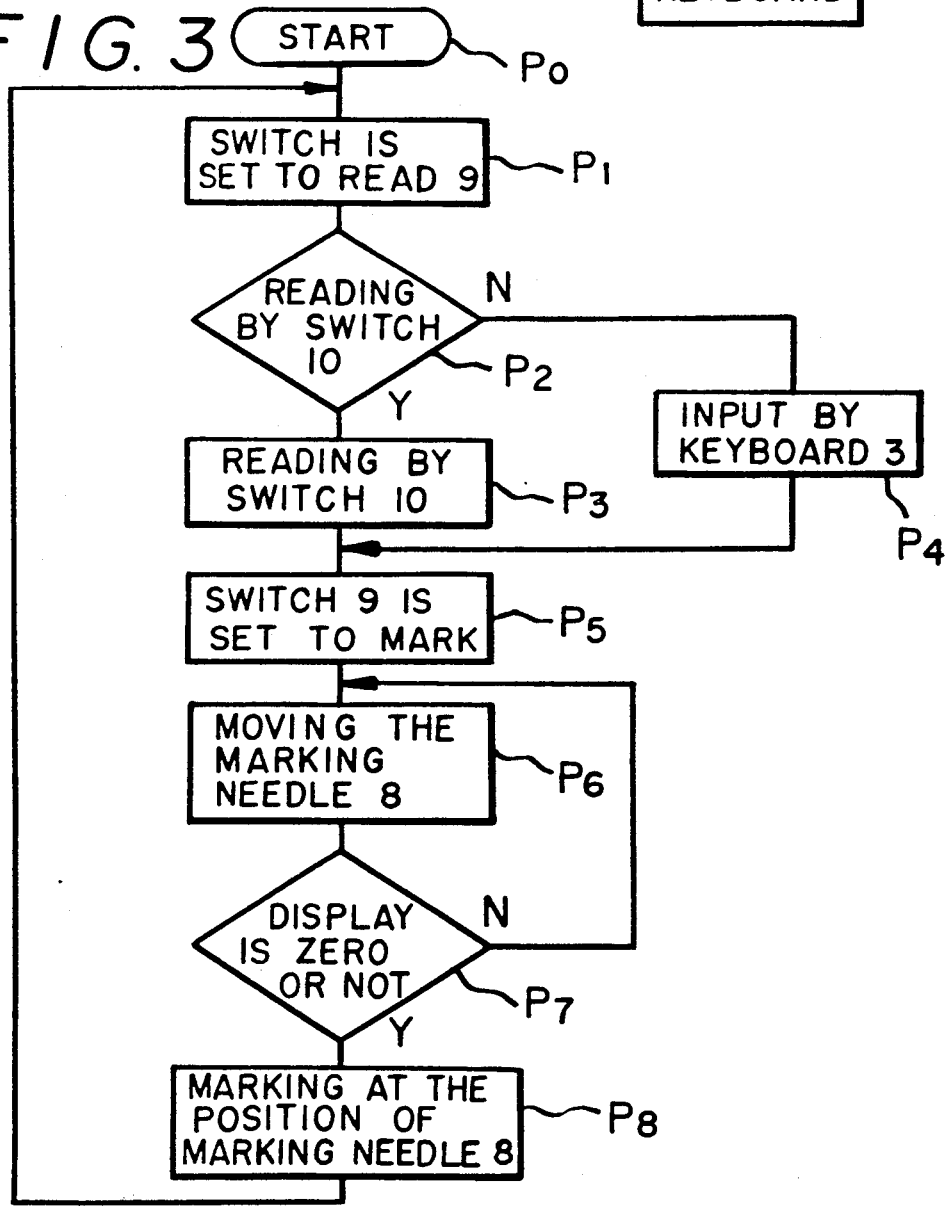
FIG. 3 is a flow chart illustrating operation of the device.

As shown in FIG. 3, at step $P_0$, the measuring lever 6 is in the position shown in FIG. 1.

The reading/marking (writing) turn over switch 9 is set for reading as shown in a step $P_1$ in FIG. 3. (This switch 9 changes alternatively to reading or marking according to an alternate push on the button).

The position mark 7' of tracing part 7 of measuring lever 6 is then shifted to a position of the coordinate position to be read, and the reading switch 10 is pushed as shown in steps $P_2$, $P_3$ in FIG. 3.

This operation is repeated according to the position of each point to be read.

2) Marking operation of an asking position.

The asked for position, such as the center of a circle, passing through three read points or a new selected point is determined by coordinate transformation is calculated from said read (given) position as explained above. The given position is input to a CPU by keys on keyboard 3 as shown by step $P_4$ in FIG. 3. Calculations in the CPU are designated by a function key or a conversion key in keyboard 3. The reading/marking (writing) turn over switch 9 is set for marking as shown in step $P_5$ in FIG. 3. Display 4 shows the values of the x axis and y axis of the difference between the present position and the position to be calculated, so that an operator can move the measuring lever 6 as shown in step $P_6$ in FIG. 3 as the displayed value become zero as shown in step $P_7$. When the value reaches zero, marking needle 8 is pushed and the position is marked on the paper as shown in step $P_8$ in FIG. 3.

The following will explain the operation of the inner device. When reading/marking (writing) turn over switch 9 is set for reading and position mark 7' of tracing part 7 is shifted to a position to be read, angular counter of roller 2 and angular counter of measuring lever 6 generate signals $c_1$, $c_2$ and are memorized in a memory. Inner calculating means calculates the mechanical coordinate position of a read point by pushing the reading switch 10. In the mechanical coordinate position, the horizontal direction of roller 2 represents the x axis and a direction vertical or perpendicular to roller 2 represents the y axis.

By this mechanical coordinate position, the coordinates of the figure to be measured are calculated, in this case, the coordinate of an original point and (plurality of) any positions to be measured are calculated and memorized in a memory.

These calculations are performed about a read position of mark 7' of tracing part 7 and not the position of marking needle 8.

3) Value input operation.

In the above case 1), the position is designated on the figure, however, it is possible to input values by a function key and value key an keyboard 3 and memorize them in the memory.

4) Marking operation of a designated position.

When the reading/marking (writing) turn over switch 9 is set to marking as shown in step $P_5$ in FIG. 3, calculating means performs calculations designated by a function key on keyboard 3 from said read or input datum. In this case, the difference of a position (e.g. the difference of another coordinate x', y') between position of sight mark 7' and marking needle 8 is corrected by calculation. Display 4 displays the difference of the value between the position of marking needle 8 and the designated position to be marked as the value of the x axis coordinate and y axis coordinate.

As explained above the display varies according to the position of marking needle 8, and the value of the display changes according to the movement of marking needle 8. Consequently, when marking needle 8 is shifted to a position to be marked, and the displayed values of x, y are zero is shows that marking needle 8 is in a position to correctly make a mark.

As explained above, according to this invention, it is possible to mark a necessary point without the necessity of complicated calculations and drawings.

I claim:

1. In a device for measuring the coordinate of a figure having a body with rollers for traversing a line in a horizontal plane, a measuring lever pivotally mounted on said body to rotate to either side of said line, the improvement comprising: character input means for entering the coordinates of a point; calculating means in said body; display means for displaying input characters and results from said calculating means; visual tracing part means having a sight mark; toggle switch means associated with said calculating means for toggling between a reading and marking operation; reading switch means for reading and recording the position of coordinates of a point located with said visual tracing part; a marking needle on an end of said measuring lever for marking the position of a selected point input by said character input means; marking position determining means comprising means for indicating in said display when said marking needle is positioned at said selected point.

2. The device according to claim 1 in which said character input means comprises a keyboard mounted on said body.

3. The device according to claim 1 including locking means for locking said measuring lever from movement after a point is selected.

4. The device according to claim 3 in which said locking means includes rotatable lock means to lock said measuring lever in a central position.

5. The device according to claim 1 in which said toggle switch means and said reading switch means are each an alternating push button switch.

6. The device according to claim 1 in which said marking position determining means comprises means connecting said rollers to said display for indicating the position of said marking means; whereby characters input to said display representing a coordinate position are adjusted according to movement of said rollers to indicate when said marking means is at a selected position to be marked.

* * * * *